US007302871B2

(12) United States Patent
Laugwitz

(10) Patent No.: US 7,302,871 B2
(45) Date of Patent: Dec. 4, 2007

(54) OSCILLATION GENERATING DEVICE

(75) Inventor: Niels Laugwitz, Koblenz (DE)

(73) Assignee: Bomag GmbH, Boppard (DE)

(*) Notice: Subject to any disclaimer, the term of this patent is extended or adjusted under 35 U.S.C. 154(b) by 577 days.

(21) Appl. No.: 10/772,248

(22) Filed: Feb. 6, 2004

(65) Prior Publication Data

US 2004/0173040 A1 Sep. 9, 2004

(30) Foreign Application Priority Data

Feb. 18, 2003 (DE) ................................ 103 06 791

(51) Int. Cl.
*F16H 33/10* (2006.01)

(52) U.S. Cl. .................. 74/87; 74/86; 172/41; 37/903; 404/133.05

(58) Field of Classification Search .................... 74/86, 74/87; 172/41; 37/903; 404/133.05, 133.1
See application file for complete search history.

(56) References Cited

U.S. PATENT DOCUMENTS

| | | | | |
|---|---|---|---|---|
| 5,067,358 | A * | 11/1991 | Ancrenaz | 74/61 |
| 6,584,866 | B2 * | 7/2003 | Greppmair | 74/22 R |
| 6,749,365 | B2 * | 6/2004 | Sina et al. | 404/133.1 |
| 2002/0104393 | A1 * | 8/2002 | Van Es et al. | 74/87 |
| 2004/0045877 | A1 * | 3/2004 | Rubie et al. | 209/366.5 |

FOREIGN PATENT DOCUMENTS

| | | |
|---|---|---|
| DE | 297 23 617 | 5/1997 |
| DE | 19547043 | 10/1998 |
| DE | 19920348 | 1/2000 |
| DE | 19943391 | 12/2003 |
| WO | 94/01225 | 7/1993 |

OTHER PUBLICATIONS

English translation of German Patent No. 297 23 617 U1, "Vibration Plate For Compacting Soil" dated Jan. 14, 1999 along with Letter of Certification.

* cited by examiner

*Primary Examiner*—David M. Fenstermacher
(74) *Attorney, Agent, or Firm*—Baker & Hostetler LLP

(57) ABSTRACT

The invention relates to an oscillation generating device for use in a soil compacter with a tipping moment compensation device. A second unbalance shaft pair with oppositely rotating unbalance shafts is arranged adjacent to a first unbalance shaft pair as a tipping moment compensation device. Diagonally opposite unbalance shafts rotate in the same direction. In this way, centrifugal forces and torques on the two unbalance shaft pairs reciprocally cancel each other out so that no tipping moment occurs parallel to the axes of rotation of the unbalances.

8 Claims, 3 Drawing Sheets

OSCILLATION GENERATING DEVICE

FIELD OF THE INVENTION

The invention relates to an oscillation generating device for use in a soil compacter such as, e.g., a vibratory plate or a roller, with an oscillation generating device, a first unbalance shaft pair, and a tipping moment compensation device.

BACKGROUND OF THE INVENTION

Traditional soil compacters, e.g., reversible vibration plates and vibration rollers, are equipped with a contrarotating unbalance shaft pair for generating directed oscillations. The unbalances of the two shafts rotate synchronously but with the opposite directions of rotation. A desired, directed direction of oscillation can be adjusted by phase shifting, and a directed forward or reverse movement of the soil compacter can be produced.

However, a periodically changing tipping moment is produced as a function of the phase position of the unbalances. This tipping moment occurs because the individual unbalances have different axes of rotation. As a consequence, the resulting centrifugal force of two unbalance shafts always is applied at another point during the course of a rotation. The direction of the resulting force does remain the same, but the effective lever arm and the magnitude of the force change. This tipping moment is undesirable because it has a disadvantageous effect on the behavior of the movement of the soil compacter.

DE 297 23 617 U1 teaches a vibration plate comprising a tipping moment compensating device for suppressing such a tipping moment. It comprises a central unbalance shaft between a pair of unbalance shafts. The unbalance mass of the central unbalance shaft is as great as the entire unbalance mass of the pair of unbalanced shafts. The central unbalance shaft rotates counter to the unbalance shaft pair rotating in the same direction, and the speed of all unbalance shafts is synchronous. As a result of this arrangement no undesired tipping moment occurs.

SUMMARY OF THE INVENTION

The present invention has the problem of improving a soil compacter of the initially mentioned type, and of creating a simple and economical alternative to the previously known tipping moment compensation device for use in a soil compacter.

This problem is solved in that a second unbalance shaft pair is arranged as a tipping moment compensation device adjacent to the first unbalance shaft pair. The first and the second unbalance shaft pairs rotate in opposite directions, and diagonally opposite unbalance shafts rotate in the same direction.

The invention has the advantage that undesired force components and torques cancel each other out so that no tipping moments occur.

Another advantage of the invention is the fact that the oscillation generator is constructed in a simple and symmetrical manner of similar components, so that economic advantages are achieved. Since the entire unbalance mass is distributed on four shafts, the entire unbalance mass can be increased, or the unbalance shafts can be given smaller dimensions.

The unbalance shafts do not have to lie adjacent to each other aligned in pairs, but rather the unbalance shafts of the one unbalance shaft pair can be offset with crosswise symmetry axially parallel to the unbalance shafts of the other unbalance shaft pair. The term “crosswise symmetry” denotes an arrangement here in which the diagonally opposite unbalance shafts are arranged in pairs symmetrically with respect to the point of intersection of their connecting lines.

The axially parallel offset can take place within the same plane or out of the plane. For example, a rear left unbalance shaft could be offset upward by a certain amount. The front right unbalance shaft would then have to be offset downward by the same amount in order to establish the required symmetry. It can also be advantageous in this instance for the spacings of the diagonally opposite unbalance shafts to be different.

There is the possibility in the device of the invention of producing a steering movement by changing the phase relation of an unbalance shaft.

The diagonal unbalance shafts can basically be driven separately. The diagonal unbalance shafts are preferably coupled in such a manner that they rotate in unison. e.g., via a transmission. This has the advantage that the diagonal unbalance shafts always retain the same direction of rotation and the same speed of rotation, which always guarantees functionality as well as the compensation of tipping moments. The synchronization is even further simplified by virtue of the fact that all unbalance shafts are coupled such that they rotate in unison.

In an advantageous embodiment, the transmission comprises two connected crown gears, and spur gears on the unbalance shafts engaging with them. This has the advantage that a transmission which guarantees the function of the device is created from relatively few simple and known components.

The transmission is preferably connected to a single drive in an operative connection. This has the advantage that the functions of the same direction of rotation and of equal speeds of the unbalance shafts can be retained, and that additional drives are not required.

Operation is simplified in that each unbalance shaft pair comprises an unbalance shaft with variable phase position. Furthermore, a synchronizing device for synchronous adjustment of the phase position is preferably present. It can either be designed for a common phase position in the same direction for both unbalance shaft pairs, or for an independent phase adjusting. An especially preferred further development is for the synchronizing device to comprise a hydraulically operated flow divider.

BRIEF DESCRIPTION OF THE DRAWINGS

The invention is explained further in the following using embodiments shown in the drawings.

DETAILED DESCRIPTION OF THE INVENTION

Figure 1:
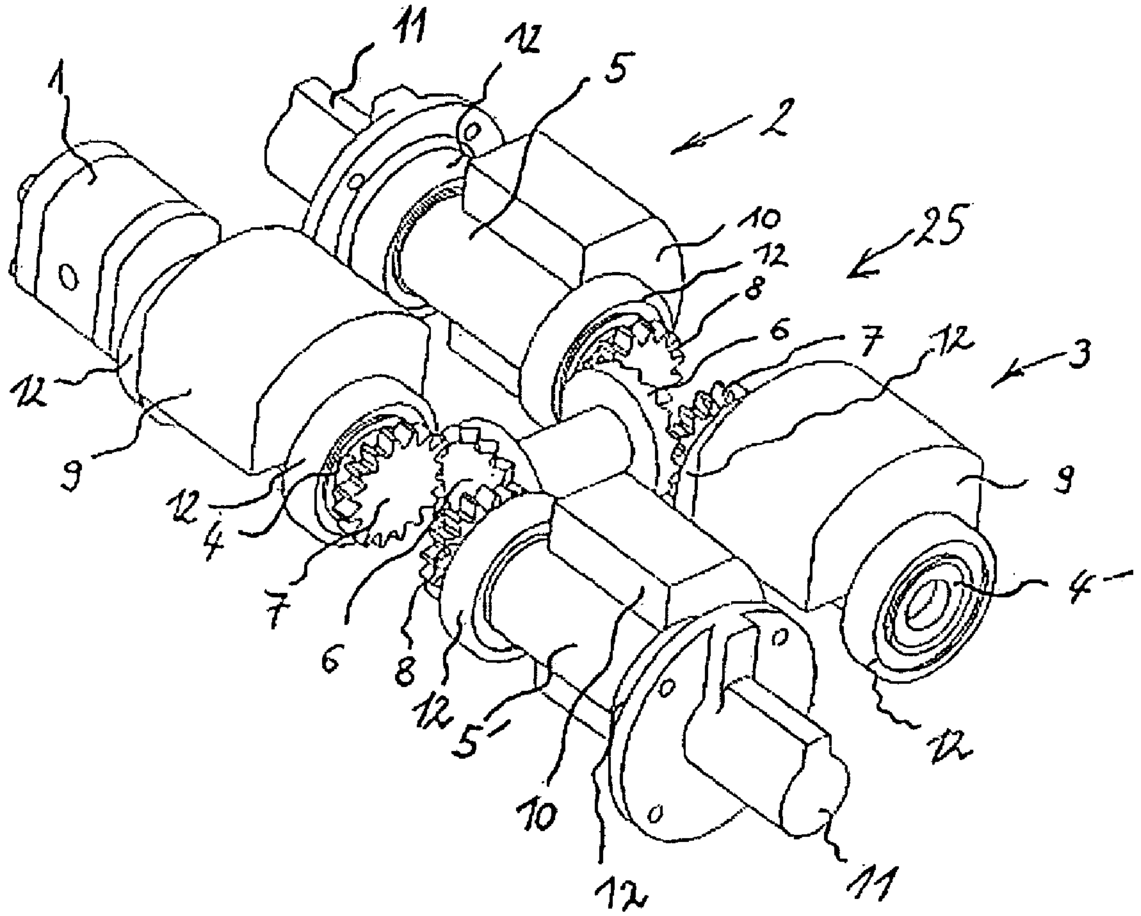
FIG. 1 is a schematic oblique view of an oscillation generating device with a central, double crown gear transmission.

FIG. 1 shows in detail a first soil compacter oscillation generating device driven by drive 1, wherein, parallel to, and laterally offset in the axial direction from, a first unbalance shaft pair 2 is arranged a second, similar unbalance shaft pair 3 as a tipping moment compensation device.

Each unbalance pair 2, 3 comprises two tandem and axially parallel unbalance shafts 4, 5 and 4', 5' that rotate in opposite directions with the same unbalance masses 9, 10. Unbalance masses 9, 10 of an unbalance shaft pair 2, 3 are offset at an angle in order to produce phase-shifted centrifugal forces. Unbalance shaft pairs 2,3 are located adjacent to each other in such a manner that their unbalance shafts are aligned in pairs. Furthermore, unbalance shafts with the same direction of rotation are located diagonally opposite each other. Unbalance shafts 4, 4' rotating in the same direction on the one hand and unbalance shafts 5, 5' rotating in opposite directions on the other hand have the same phase position when traveling straight ahead. The phase positions can be differently adjusted for a steering movement.

Thus, this provides an arrangement in which diagonally arranged unbalance shafts are axially offset in a uniformly opposing manner relative to an imaginary center axis running parallel to the axes of the unbalance shafts.

Unbalance shafts 4, 4', 5, 5' are coupled to each other by a positive force transfer means such that they rotate in unison, so that the directions of rotation and phase associations are assured. In the present example, the force transfer means is designed as a double crown gear transmission 25. Its crown gears 6, rotationally solidly connected, such that each mesh on either side with a spur gear 7 and a contrarotating spur gear 8. Spur gears 7, 8 are rotationally solidly connected to unbalance shafts 4, 4' and 5,5'. Drive 1 acts via unbalance shaft 4 on the crown gear transmission. Unbalance shafts [sic; masses] 9, 10 are held by support elements 12, e.g., roller bearings.

The diagonally opposite unbalances of unbalance shafts 5, 5' can be changed in their phase position, by themselves or jointly, relative to the other unbalances in that the unbalance masses 10 concerned are angularly offset on their unbalance shafts 5, 5'. For this purpose, two hydraulically actuated rotating devices 11 are used that are arranged on the front ends of unbalance shafts 5, 5'.

If the two diagonally opposite unbalance shafts [sic; masses] 10 are simultaneously adjusted in their phase position, the direction of the resulting centrifugal force changes. The direction of oscillation also changes, and the soil compacter moves forward or backward. If only one of the two shafts 10 is changed in its phase position a steering motion is created.

Figure 2:
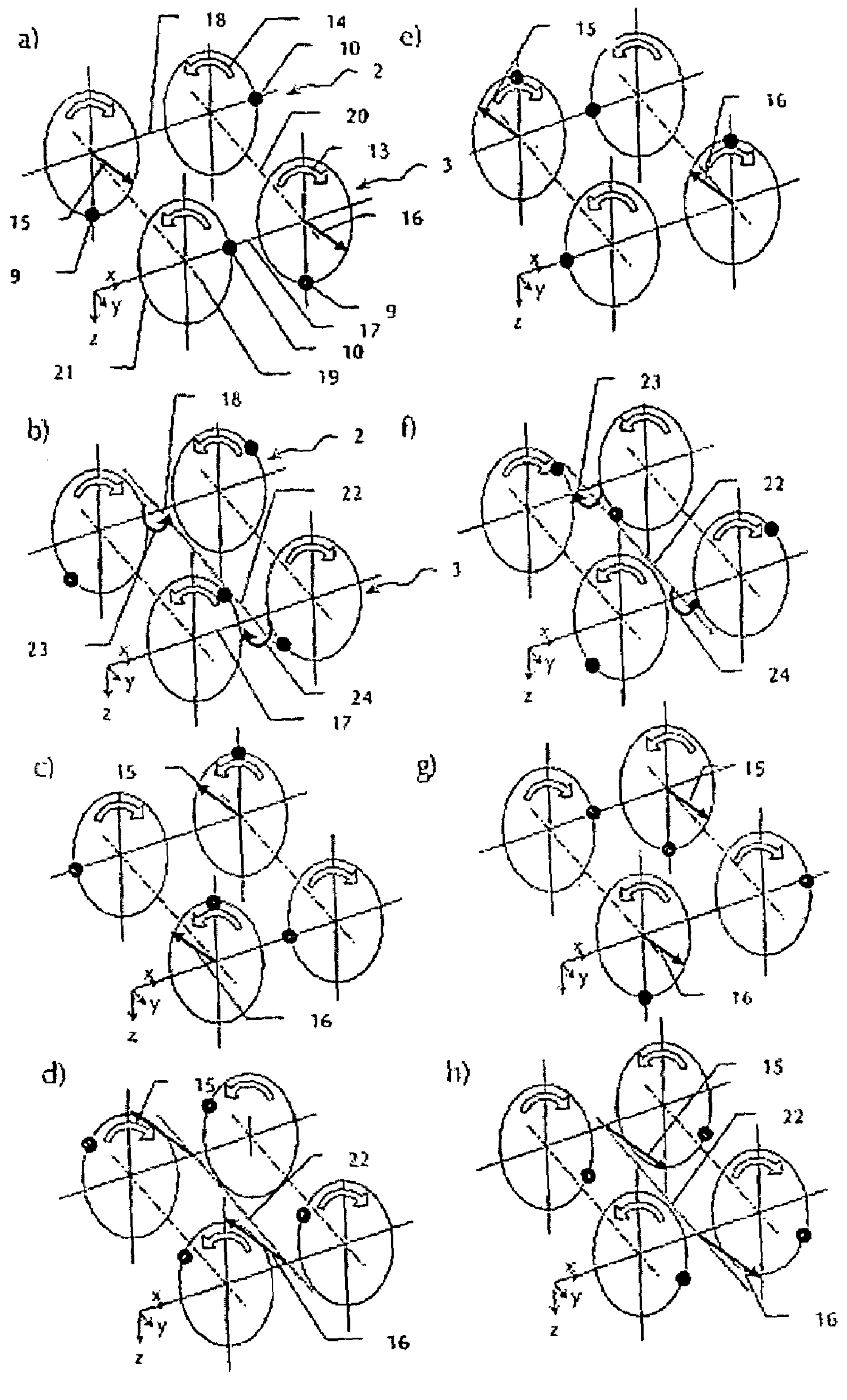
FIG. 2 is a schematic view of the individual phase positions of the unbalances of the oscillation generating device.

FIG. 2 shows the method of operation of the oscillation generating device in a three-dimensional schematic view. To this end, FIG. 2 shows eight phase positions a) to h) of the unbalances during the course of a complete shaft revolution. Filled-in black points represent the particular angular positions of unbalance masses 9, 10. Unbalance masses 9 rotate clockwise, the direction of rotation being indicated by curved arrow 13, and unbalance masses 10 rotate counterclockwise, the direction of rotation being indicated by arrow 14. In addition, unbalance masses 9, 10 of an unbalance shaft pair 2, 3 are phase-shifted by 90°. Diagonally opposite unbalance masses have the same phase.

In the figure, the centrifugal forces of each unbalance shaft pair are combined into one resulting centrifugal force and indicated as solid black arrow 15, 16. Arrows 15, 16 are entered at the point of application of the resulting centrifugal force and point in the direction in which the resulting centrifugal force acts. In addition, the length of the arrow represents the magnitude of the force. Arrow 15 designates the resulting centrifugal force 15 of the one unbalance shaft pair 2, and arrow 16 the resulting centrifugal force 16 of the other unbalance pair 3.

The initial position according to FIG. 2*a*) shows the start of the rotational movement. On rear longitudinal axis 18 unbalance 9 rotates clockwise around transverse axis 19. Unbalance 10 rotates counterclockwise around transverse axis 20. The resulting centrifugal force 15 of the rear unbalance shaft pair 2 acts at the intersection of longitudinal connecting axes 18, 19 and acts obliquely downward in the x-z direction, that is, in the direction of the foundation soil. The resulting centrifugal force 16 of unbalances 9, 10 of the second unbalance shaft pair 3 on front longitudinal axis 17 is likewise directed. The resulting centrifugal force 16 acts at the intersection of longitudinal connecting axes 17, 20. Since the two resulting centrifugal forces 15, 16 are equally great and directed in parallel, no tipping moment occurs.

FIG. 2*b*) shows a second phase of the rotary movement in which the unbalance masses are offset by 45° in the direction of rotation. The centrifugal forces in each unbalance shaft pair 2,3 are precisely opposite. Two equally large torques 23, 24 are produced around an imaginary horizontal central axis 22. However, they cancel each other out since they are oppositely directed on account of the opposite directions of rotations of unbalance shaft pairs 2,3. As a result, no tipping moment parallel to the axes of rotation of the unbalances therefore occurs.

In FIG. 2*c*) the unbalances are offset by another 45° in the direction of rotation. Equally directed resulting centrifugal forces 15, 16 of the same magnitude occur on the two unbalance shaft pairs 2, 3. They are diagonally offset in their points of application in comparison to the first phase shown in FIG. 2*a*). The direction in which the two resulting centrifugal forces act runs obliquely upward.

As the rotation of unbalances 9, 10 progresses and as the phase correspondence of the unbalances increases, the points of application of the resulting centrifugal forces 15, 16 migrate onto central axis 22, as FIG. 2*d* shows. Since they are large and equally directed the same way, no tipping moment occurs.

The conditions described above are repeated in a logical manner with exchanged directions and points of application of the centrifugal forces in the further phases illustrated in FIGS. 2*e*) to 2*h*). However, the same result obtains, namely that in no instance does a tipping moment parallel to the axes of rotation of the unbalances occur.

Figure 3:
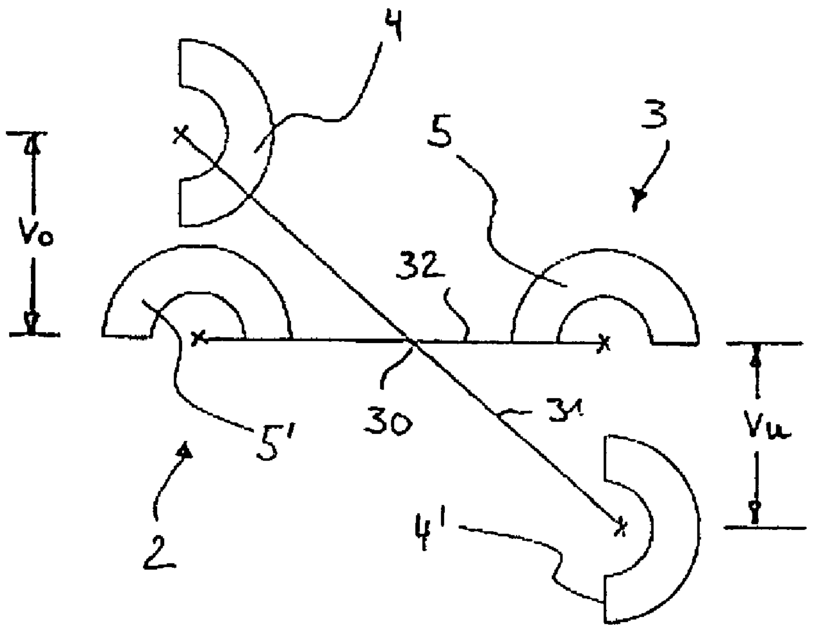
FIG. 3 shows a schematic side view of a second embodiment of an oscillation generating device.
Figure 4:
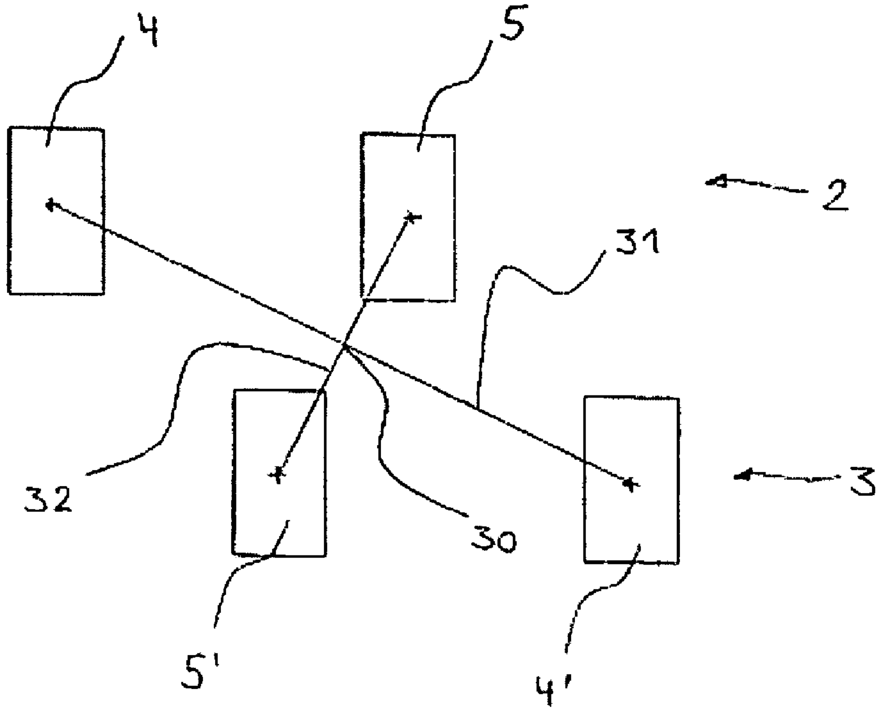
FIG. 4 schematically shows a top view of a third embodiment of an oscillation generating device.

In the second and third embodiments shown in FIGS. 3, 4, unbalance shafts 4, 5 of the one unbalance shaft pair 2 are offset in an axially parallel manner with crossed symmetry relative to unbalance shafts 4', 5' of the other unbalance shaft pair 3. The crossed symmetry results in the fact that the diagonally opposite unbalance shafts 4, 4'; 5, 5' are arranged symmetrically in pairs relative to intersection point 30 of their connecting lines 31, 32.

FIG. 3 illustrates an arrangement of diagonally opposite unbalance shafts 5, 5', spatially offset upward and downward, respectively, in an axially parallel manner relative to diagonally opposite coplanar unbalance shafts 4, 4'. The upward offset Vo and the downward offset Vu are identical.

In the fourth embodiment according to FIG. 4, all unbalance shafts are located in one plane and the spacings of diagonally opposite unbalance shafts 5, 5' and 4, 4' are different.

The invention claimed is:

1. An oscillation generating device for use in a soil compacter, comprising a first unbalance shaft pair and a tipping moment compensation device wherein a second unbalance shaft pair is arranged adjacent to the first unbalance shaft pair as the tipping moment compensation device wherein the unbalance shaft pairs rotate in opposite directions, and diagonally opposite unbalance shafts rotate in the same direction, wherein the unbalance shafts of the first unbalance shaft pair are offset in crossed symmetry, and in an axially parallel manner, relative to the unbalance shafts of the second unbalance shaft pair and wherein the spacings of the diagonally opposite unbalance shafts are different, wherein the diagonal unbalance shafts are coupled so that they rotate in unison and wherein the coupling rotating in unison includes a transmission with two crown gears, and spur gears on the unbalance shafts and meshing with them.

2. The oscillation generating device according to claim 1, wherein the unbalance shafts of the first unbalance shaft pair are aligned pairwise with the unbalance shafts of the second unbalance shaft pair.

3. The oscillation generating device according to claim 1, further comprising a device present for independent phase adjustment.

4. The oscillation generating device according to claim 1, wherein all unbalance shafts are coupled so that they rotate in unison.

5. The oscillation generating device according to claim 1 wherein the unbalance shafts are located in one plane.

6. The oscillation generating device according to claim 1, wherein the unbalance shafts are arranged spatially offset relative to each other.

7. The oscillation generating device according to claim 1 wherein each unbalance shaft pair comprises an unbalance shaft with changeable phase position.

8. The oscillation generating device according to claim 1, wherein the transmission is operatively connected to a single drive.

* * * * *